United States Patent
Hammerstrom

(10) Patent No.: US 11,106,228 B2
(45) Date of Patent: Aug. 31, 2021

(54) THERMAL ENERGY STORAGE APPARATUS, CONTROLLERS AND THERMAL ENERGY STORAGE CONTROL METHODS

(71) Applicant: Battelle Memorial Institute, Richland, WA (US)

(72) Inventor: Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1333 days.

(21) Appl. No.: 15/144,590

(22) Filed: May 2, 2016

(65) Prior Publication Data
US 2016/0246313 A1    Aug. 25, 2016

Related U.S. Application Data

(60) Division of application No. 12/895,658, filed on Sep. 30, 2010, now Pat. No. 9,331,483, which is a (Continued)

(51) Int. Cl.
*G05D 23/19* (2006.01)
*F28D 20/00* (2006.01)
(Continued)

(52) U.S. Cl.
CPC ..... *G05D 23/1923* (2013.01); *F28D 20/0034* (2013.01); *H02J 3/28* (2013.01);
(Continued)

(58) Field of Classification Search
CPC . G05D 23/19; G05D 23/1902; G05D 23/1923
See application file for complete search history.

(56) References Cited

U.S. PATENT DOCUMENTS 4,234,782 A * 11/1980 Barabas ............... F24H 7/0416
                                                  392/345
5,852,359 A * 12/1998 Callahan, Jr. ........... G05F 1/565
                                                  323/274
(Continued)

FOREIGN PATENT DOCUMENTS

EP        21010510      9/2009
JP      2006-029635     2/2006
(Continued)

OTHER PUBLICATIONS

WO PCT/US2011/040393 Search Rept., dated Aug. 8, 2012, Battelle Memorial Institute.
(Continued)

*Primary Examiner* — Frantz F Jules
*Assistant Examiner* — Daniel C Comings
(74) *Attorney, Agent, or Firm* — Wells St. John P.S.

(57) ABSTRACT

Thermal energy storage apparatus, controllers and thermal energy storage control methods are described. According to one aspect, a thermal energy storage apparatus controller includes processing circuitry configured to access first information which is indicative of surpluses and deficiencies of electrical energy upon an electrical power system at a plurality of moments in time, access second information which is indicative of temperature of a thermal energy storage medium at a plurality of moments in time, and use the first and second information to control an amount of electrical energy which is utilized by a heating element to heat the thermal energy storage medium at a plurality of moments in time.

30 Claims, 8 Drawing Sheets

Related U.S. Application Data continuation-in-part of application No. 12/641,206, filed on Dec. 17, 2009, now Pat. No. 8,590,802.

(51) Int. Cl.
*H02J 3/28* (2006.01)
*H05B 1/02* (2006.01)
*H02J 3/38* (2006.01)
*H02J 9/06* (2006.01)

(52) U.S. Cl.
CPC .............. *H02J 3/383* (2013.01); *H02J 3/386* (2013.01); *H02J 9/06* (2013.01); *H05B 1/0227* (2013.01); *Y02P 80/10* (2015.11)

(56) References Cited

U.S. PATENT DOCUMENTS

| | | | |
|---|---|---|---|
| 5,956,462 | A | 9/1999 | Langford |
| 5,968,393 | A | 10/1999 | Demaline |
| 6,363,216 | B1 | 3/2002 | Bradenbaugh |
| 7,010,363 | B2 | 3/2006 | Donnelly et al. |
| 7,234,646 | B2 | 6/2007 | Saitoh |
| 8,590,802 | B2 | 11/2013 | Hammerstrom |
| 9,331,483 | B2 | 5/2016 | Hammerstrom |
| 2007/0132249 | A1 | 6/2007 | Andrew et al. |
| 2007/0162689 | A1 | 7/2007 | Choi |
| 2007/0220907 | A1 | 9/2007 | Ehlers |
| 2007/0290507 | A1 | 12/2007 | Andrew et al. |
| 2009/0164393 | A1 | 6/2009 | Takano et al. |
| 2010/0072817 | A1 | 3/2010 | Hirst |
| 2010/0204849 | A1* | 8/2010 | Steffes .................. G05B 15/02 700/296 |
| 2011/0083443 | A1 | 4/2011 | Jockenhoevel et al. |
| 2011/0147360 | A1 | 6/2011 | Hammerstrom |
| 2011/0147473 | A1 | 6/2011 | Hammerstrom |

FOREIGN PATENT DOCUMENTS

| | | | | |
|---|---|---|---|---|
| JP | 2007-056748 | | 3/2007 | |
| WO | WO 2006/079123 A2 | * | 7/2006 | |
| WO | WO 2006-568959 | * | 7/2006 | ............. G05D 23/19 |
| WO | PCT/US2011/040393 | | 4/2013 | |

OTHER PUBLICATIONS

WO PCT/US2011/040393 Writt. Opin., dated Aug. 8, 2012, Battelle Memorial Institute.

DeSteese et al., "Resource Form Factor and Installation of GFA Controllers", Technical Report. Pacific Northwest National Laboratory, Richland, WA.; Nov. 2009; 22 pp.

Energy Information Administration Official Energy Statistics from the U.S. Government Consumption & Expenditures Data Tables; EIA. 2001; 4 pp; "http://www.eia.doe.gov/emeu/recs/recs2001_ce/ce4-12c_westregion2001.html".

Hammerstrom et al., Pacific Northwest GridWise™ Testbed Demonstration Projects; Part II. Grid Friendly™ Appliance Project; PNNL17079; http://gridwise.pnl.gov. Oct. 2007; 123 pp.

Hammerstrom, DJ; Final Letter Report: Grid-Responsive Demand-Side Control Using Grid Friendly Appliance Technologies; PNNL-18997, Pacific Northwest National Laboratory, Richland, WA; Nov. 2009, 22 pages.

Lu et al., "Design Considerations for Frequency Responsive Grid Friendly™ Appliances," in IEEE 2005 Power Engineering Society TD 2005/2006; pp. 647-652; May 21-24, 2006.

Lu et al., "Grid Friendly™ Device Model Development and Simulation", Technical Report. Pacific Northwest National Laboratory, Richland, WA.; Nov. 2009; 52 pp.

Short et al., "Stabilization of Grid Frequency through Dynamic Demand Control", IEEE Transactions on Power Systems vol. 22, No. 3, Aug. 2007, United States, 9 pages.

* cited by examiner

THERMAL ENERGY STORAGE APPARATUS, CONTROLLERS AND THERMAL ENERGY STORAGE CONTROL METHODS

RELATED PATENT DATA

The present application is a divisional application of and claims priority to U.S. patent application Ser. No. 12/895,658 filed on Sep. 30, 2010, entitled "Thermal Energy Storage Apparatus, Controllers and Thermal Energy Storage Control Methods", which is a continuation-in-part of and claims priority to U.S. patent application Ser. No. 12/641,206 filed on Dec. 17, 2009, now U.S. Pat. No. 8,590,802, entitled "Water Heater Control Module", naming Donald J. Hammerstrom, as inventor, the disclosures of which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to thermal energy storage apparatus, controllers and thermal energy storage control methods.

BACKGROUND OF THE DISCLOSURE

Consumption of and reliance upon electrical energy is increasing. Usage of electrical energy is ubiquitous in almost every aspect of life. Businesses, entertainment, communications, etc. are heavily dependent upon electrical energy for fundamental operation. Power distribution and transmission systems or grids provide electrical energy to households, businesses, manufacturing facilities, hospitals, etc.

Some electrical power distribution systems are ever-changing dynamic systems and operations are often concerned with balancing generation with load. Typically, control of the state of the electrical power distribution system is implemented by controlling operations of generators coupled with the system. For example, at times of increased demand, the output of generators may be increased and/or other generators may be brought on-line to assist with supplying the electrical energy. In addition, spinning reserves may be utilized to accommodate unexpected significant fluctuations in demand for electrical energy. Provision of spinning reserves is relatively costly, and much of the time, not used.

Utilities may use other devices at distribution points (e.g., substations and/or switchyards) to manage electrical power distribution operations. Exemplary management devices include underfrequency and undervoltage relays. These devices may "black out" entire neighborhoods when a grid is in trouble allowing the grid to recover before power is reapplied to the blacked out customers.

At least some of the aspects of the present disclosure are directed towards improved apparatus and methods for supplying electrical energy to thermal energy storage devices.

BRIEF DESCRIPTION OF THE DRAWINGS

Exemplary embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

According to one embodiment, a thermal energy storage apparatus controller comprises processing circuitry configured to access first information which is indicative of surpluses and deficiencies of electrical energy upon an electrical power system at a plurality of moments in time, access second information which is indicative of temperature of a thermal energy storage medium at a plurality of moments in time, and use the first and second information to control an amount of electrical energy which is utilized by a heating element to heat the thermal energy storage medium at a plurality of moments in time.

According to an additional embodiment, a thermal energy storage control method comprises accessing information regarding a state of an electrical power system and controlling the application of electrical energy to a heating element of a thermal energy storage apparatus which is configured to heat a thermal energy storage medium, wherein the controlling comprises increasing an amount of the electrical energy utilized by the heating element to heat the thermal energy storage medium as a result of the accessed information indicating a presence of a surplus of electrical energy upon the electrical power system.

According to another embodiment, a thermal energy storage control method comprises heating a thermal energy storage medium using electrical energy which is supplied by an electrical power system, accessing information which is indicative of a relationship of generation and consumption of electrical energy with respect to the electrical power system, and using the accessed information, adjusting an amount of electrical energy which is utilized to implement the heating of the thermal energy storage medium to reduce a difference between generation and consumption of the electrical energy of the electrical power system.

Figure 1:
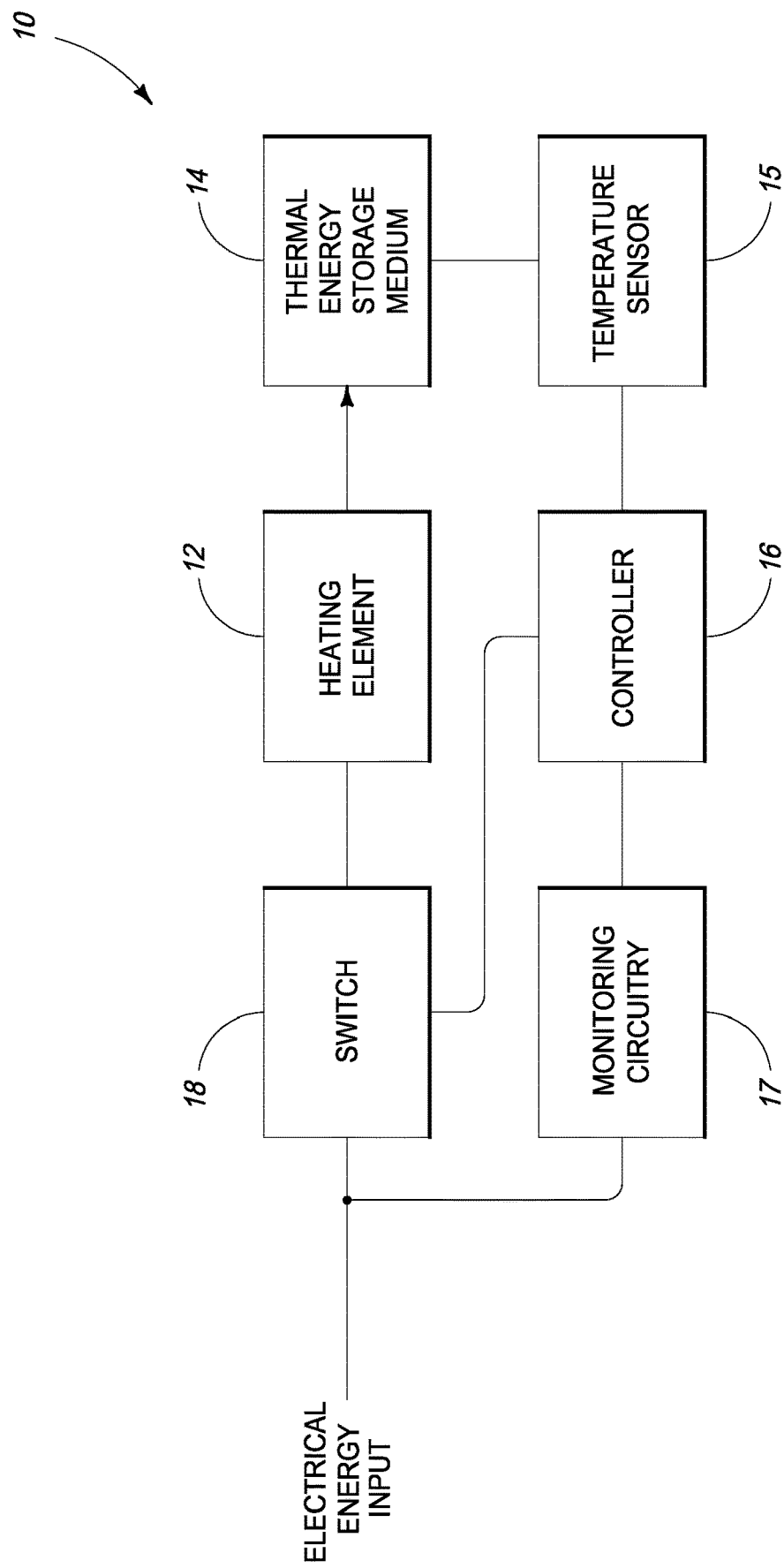
FIG. 1 is a functional block diagram of circuitry which is configured to provide electrical energy to a thermal energy storage device according to embodiment.

Referring to FIG. 1, one arrangement for providing electrical energy from an electrical power system to a thermal energy storage apparatus 10 is shown according to one embodiment. The apparatus 10 receives the electrical energy from the electrical power system via an electrical energy input in the illustrated embodiment.

The electrical power system may be configured differently in different embodiments. One example of an electrical power system is an electrical transmission and distribution system described with respect to FIG. 2. In another embodiment, the electrical power system may be embodied as a small electrical power system (e.g., microgrid), for example, which may be utilized to supply AC electrical energy to remote villages, or utilized as backup power systems, in some examples. Such small electric power systems have limited resources and controllers to maintain accurate balance between electrical load and generation and therefore could benefit from utilization of electric loads described in this present disclosure. Controlled thermal storage devices described herein may be installed as a relatively significant fraction of total electric load in small electric power systems and microgrids. Additionally, small electric power systems may use electric power system voltage and/or frequency as control variables, which electrical characteristics may be monitored and responded to according to some aspects of the present disclosure. In doing so, small electric power systems could steer electrical loads to consume energy that becomes available from generation resources such as solar or wind renewable generators.

In one example, an increased amount of energy may be available at one period of time (e.g., due to relatively high wind speeds resulting in increased generation from wind generators) and operators of the electrical power system may intentionally manipulate the characteristics of the electrical energy which is supplied to the consumers to control the operations of apparatuses 10. In one specific example, the frequency of the electrical energy may be intentionally increased which would result in apparatuses 10 consuming an increased amount of energy (compared with an amount of electrical energy which would be otherwise consumed at a lower frequency) as discussed in further detail below. Likewise, if reduced wind speeds are experienced or expected during a different period of time, the operators may intentionally reduce the frequency of the electrical energy which is supplied to the consumers to reduce the consumption of the electrical energy by the apparatuses 10 (compared with an amount of electrical energy which would be otherwise consumed at a higher frequency) as is also discussed in further detail below.

The electrical energy is utilized (consumed) by the heating element 12 of the thermal energy storage apparatus 10 to heat a thermal energy storage medium 14 of the apparatus 10. In one specific example, the thermal energy storage apparatus 10 is implemented as a water heater, for example, which is typically installed in residential and commercial structures, and the heating element 12 is configured to utilize electrical energy from the electrical power system to heat the thermal energy storage medium 14 in the form of water within a reservoir of the water heater. Other embodiments of thermal energy storage apparatus 10 which are configured to store thermal energy are possible. In one alternative example of apparatus 10, the heating element 12 heats the thermal energy storage medium 14 which comprises one or more bricks, rocks or other heat storage configuration.

The apparatus 10 additionally includes a temperature sensor 15 which is configured to monitor the temperature of the thermal energy storage medium 14 (e.g., water) in one embodiment. FIG. 1 also illustrates a controller 16, monitoring circuitry 17 and a switch 18 in the depicted example.

The controller 16, monitoring circuitry 17 and switch 18 may be implemented in different arrangements in different embodiments. Switch 18 is configured to receive electrical energy via an input from the electrical power system.

For example, the controller 16, monitoring circuitry 17 and switch 18 may be installed in the thermal energy storage apparatus 10 during manufacture of the apparatus 10 in one embodiment. In other embodiments, the controller 16, monitoring circuitry 17 and switch 18 may be provided as a retrofit kit which may be installed within an already manufactured thermal energy storage apparatus 10, or as an add-on module which is configured to interface with an already manufactured apparatus 10.

One embodiment of the controller 16 which is installed during manufacture of the apparatus 10 may be configured to control other operations of the apparatus 10 (e.g., control the apparatus 10 according to a thermostat setting by the consumer as well as control other functions, such as indicators which indicate a status of the apparatus 10). The controller 16 of a retrofit kit or add-on module may be configured to interface with an existing controller of the apparatus 10. Additional details of one embodiment of a retrofit kit which may be installed upon an existing water heater are described below with respect to FIGS. 6-8.

Thermal energy storage apparatus 10 utilizes electrical energy from the electrical power system to maintain a temperature of the thermal energy storage medium 14 within a desired temperature range in one described embodiment. As described below with respect to FIG. 2, one embodiment of an electrical power system 20 conducts electrical energy from power generation systems to a plurality of consumer loads, such as thermal energy storage apparatus 10. The electrical power system conducts alternating current (AC) electrical energy at a nominal frequency (e.g., 50 Hz, 60 Hz) in the described embodiment.

The state of electrical power system dynamically changes throughout a given day as consumption and/or generation of electrical energy fluctuate. The frequencies of the voltage or current of electrical energy upon the electrical power system also dynamically change and the frequencies are indicative of a relationship of generation and consumption of electrical energy of the electrical power system.

The frequency of the electrical energy (e.g., frequency of the voltage) remains constant when the consumption and generation of the electrical energy are equal. However, as consumption and/or generation of electrical energy fluctuate, the frequency of the electrical energy may vary. More specifically, the frequency decreases when there is higher consumption than generation of the electrical energy and the frequency increases when there is less consumption than generation. For stability of the electrical power system, it is desired to maintain a substantially equal balance of electrical energy generation and consumption wherein the frequency of the electrical energy upon the electrical power system is substantially constant.

At least some embodiments of the disclosure are directed towards controlling consumption of electrical energy of the thermal energy storage apparatus 10 using information regarding the state of generation and consumption of the electrical energy of the electrical power system, and to assist with balancing the generation and consumption of the electrical energy upon the electrical power system. As described below in one embodiment, methods and apparatus of the disclosure implement operations (e.g., control heating of the thermal energy storage medium 14) reduce a difference between electrical energy consumption and generation upon electrical power system compared with an arrangement where the operations of the apparatus 10 are not implemented. This reduction of a difference between generation and consumption of electrical energy upon the system may be referred to as improving the state of balance of the electrical power system.

As discussed in further detail below, controller 16 is configured to monitor a status of generation and consumption of electrical energy upon the electrical power system and to use the monitored status to control an amount of electrical energy which is consumed by the apparatus 10 in an attempt to reduce a difference between electrical energy consumption and generation upon the electrical power system. In one embodiment, monitoring circuitry 17 is configured to monitor and provide information regarding a characteristic of the electrical energy (e.g., frequency) upon the electrical power system to the controller 16. Controller 16 uses the output of the monitoring circuitry 17 to control the state of switch 18 which controls the amount of electrical energy which is consumed by the apparatus 10 as discussed in further detail below. In one embodiment, controller 16 also accesses information regarding a temperature of the thermal energy storage medium 14 via temperature sensor 15 and utilizes the temperature information to control the amount of electrical energy which is consumed by heating element 12 via switch 18 as discussed in further detail below.

In one embodiment, switch 18 is implemented as a hybrid relay. The hybrid relay has an electromechanical relay and a semiconductor switch that are electrically coupled with one another in parallel in one more specific embodiment. In this example configuration, the semiconductor switch may be configured to close the connection prior to the electromechanical relay, and the electromechanical relay may be configured to open the connection prior to the semiconductor switch. This example configuration of switch 18 provides rapid switching while preserving the longevity of electrical components, such as the electromechanical relay.

Figure 2:
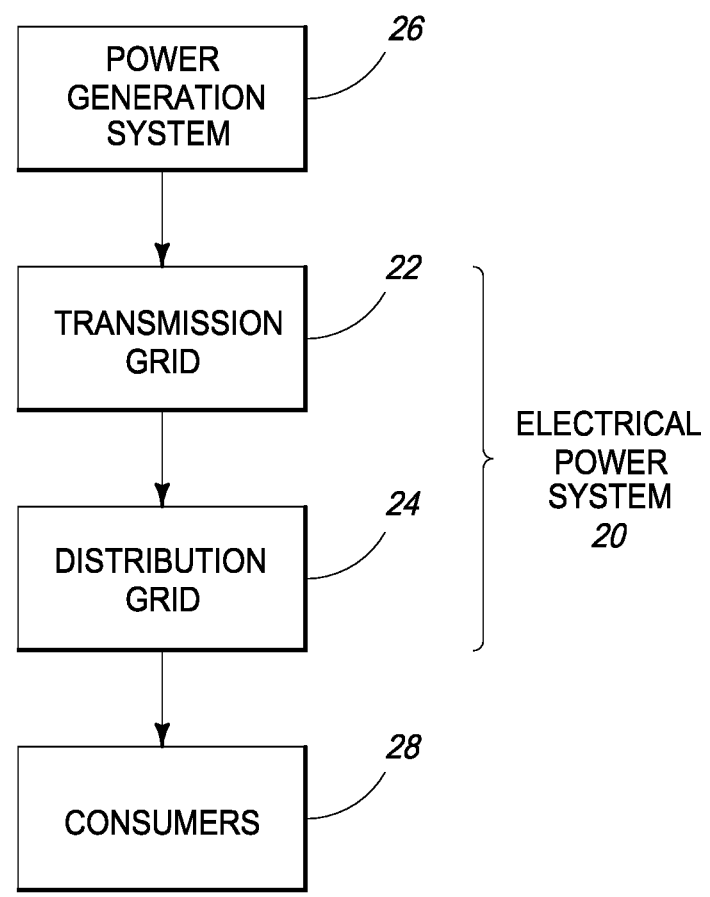
FIG. 2 is a functional block diagram of an electrical generation and consumption system according to one embodiment.

Referring to FIG. 2, one embodiment of an electrical power system 20 is shown. The electrical power system 20 is an electrical grid and includes a transmission grid 22 and distribution grid 24 in the illustrated embodiment. The transmission and distribution grids 22, 24 of the electrical power system 20 include a network of electrical conductors which transmit and distribute electrical energy generated by power generation systems 26 to loads of consumers 28 (e.g., thermal energy storage apparatus 10) where the electrical energy is consumed or utilized. Example power generation systems 26 include coal plants, nuclear plants, hydro-electric plants, solar farms, and wind farms. Example consumers 28 include industrial factories, residential neighborhoods, farms, and other entities which consume electrical energy.

The transmission grid 22 and distribution grid 24 of the electrical power system 20 may conduct electrical energy of different voltages (e.g., extra high voltage energy, high voltage energy and/or low voltage electrical energy). Some of the conductors of the electrical power system 20 may conduct electrical energy over significant distances between remote geographical locations (e.g., between different states) in one embodiment.

Figure 3:
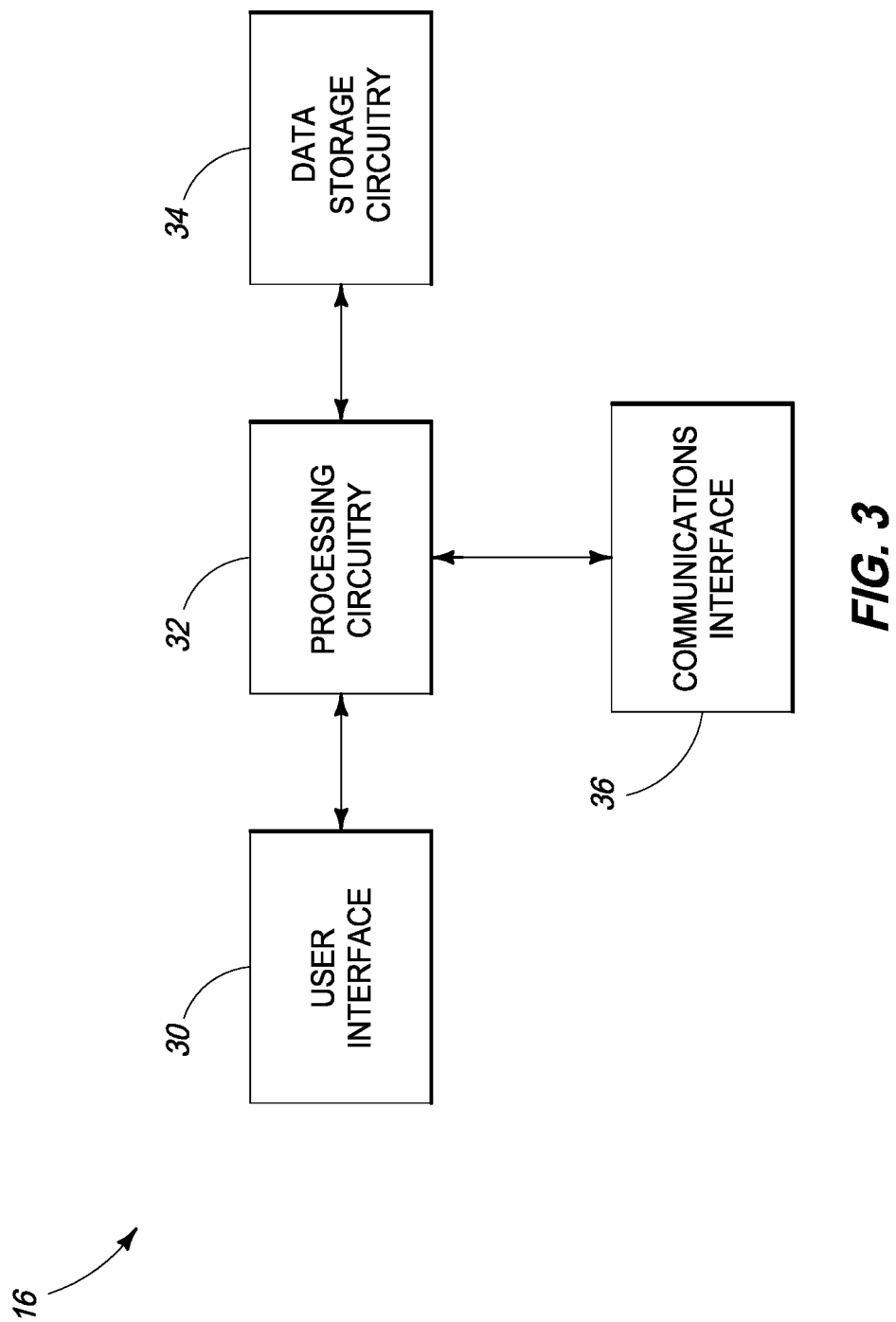
FIG. 3 is a functional block diagram of a controller which configured to control the supply of electrical energy to a thermal energy storage device according to one embodiment.

Referring to FIG. 3, one embodiment of controller 16 is shown. As mentioned above, the controller 16 may be implemented within a retrofit kit, an add-on module, or as the controller of the thermal energy storage apparatus 10 in example embodiments. In the illustrated arrangement, the controller 16 comprises a user interface 30, processing circuitry 34, storage circuitry 34 and a communications interface 36. Other embodiments are possible including more, less, and/or alternative components.

A user may interact with user interface 30, for example, to control different operations of the controller 16 and/or thermal energy storage apparatus 10. In but one example, the user may access the user interface 30 to set the desired operational temperature range of the thermal energy storage apparatus 10.

In one embodiment, processing circuitry 32 is arranged to access and process data, control data access and storage, issue commands, and control other desired operations of controller 16 and/or apparatus 10. For example, processing circuitry 32 is configured to implement the control functionality of controller 16 in one embodiment. More specifically, the processing circuitry 32 is configured to access information regarding the temperature of the thermal energy storage medium 14 from temperature sensor 15, access information regarding the electrical energy upon the electrical power system using monitoring circuitry 17, and to determine appropriate amounts of electrical energy to be consumed by heating element 12 using the accessed information and as described in further detail in illustrative embodiments below.

Processing circuitry 32 may comprise circuitry configured to implement desired programming provided by appropriate computer-readable storage media in at least one embodiment. For example, the processing circuitry 32 may be implemented as one or more processor(s) and/or other structure configured to execute executable instructions including, for example, software and/or firmware instructions. Other exemplary embodiments of processing circuitry 32 include hardware logic, PGA, FPGA, ASIC, state machines, and/or other structures alone or in combination with one or more processor(s). These examples of processing circuitry 32 are for illustration and other configurations are possible.

Data storage circuitry 34 is configured to store programming, such as executable code or instructions (e.g., software and/or firmware), electronic data, databases, or other digital information and may include computer-readable storage media. At least some embodiments or aspects described herein may be implemented using programming stored within one or more computer-readable storage medium of data storage circuitry 34 and configured to control appropriate processing circuitry 32.

The computer-readable storage medium may be embodied in one or more articles of manufacture which can contain, store, or maintain programming, data and/or digital information for use by or in connection with an instruction execution system including processing circuitry 32 in the exemplary embodiment. For example, exemplary computer-readable storage media may be non-transitory and include any one of physical media such as electronic, magnetic, optical, electromagnetic, infrared or semiconductor media in some embodiments. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 36 is arranged to implement communications of controller 16 with respect to external devices (not shown). For example, communications interface 36 may be arranged to communicate information bi-directionally with respect to apparatus 10. Communications interface 36 may be implemented as a network interface card (NIC), serial or parallel connection, USB port, Firewire interface, flash memory interface, or any other suitable arrangement for implementing communications with respect to controller 16. In one specific embodiment, communications interface 36 is configured to communicate with an appropriate communications entity of a power generation utility which may provide commands and/or data to the communications interface 36.

As mentioned above, it is desired to balance the power generation with power consumption for stability of the electrical power system. In example embodiments discussed below, the thermal energy storage apparatus 10 and described methods reduce a difference between electrical energy consumption and generation upon the electrical power system. In some implementations, apparatus 10 is configured to adjust an amount of electrical energy which is consumed by the thermal energy storage apparatus 10 in an attempt to reduce a disparity of consumption and generation of the electrical energy upon the electrical power system.

In one embodiment, an electrical characteristic of the electrical energy upon the electrical power system (e.g., electrical energy being conducted using the conductors of the electrical power system) may be monitored and utilized by controller 16 to control the consumption of electrical energy by the heating element 12 to improve the balance of electrical energy generation and consumption upon the electrical power system.

In one embodiment discussed above, example characteristics which may be monitored include frequencies of the current or voltage of the electrical energy. These characteristics may be used as indicators of variances between generation of electrical energy and usage of electrical energy by loads coupled with the electrical power system (i.e., indicative of surpluses and deficiencies of electrical energy upon the electrical power system). For example, when demand exceeds generation, the frequency of the current or voltage of the electrical energy on the electrical power system decreases, and conversely, when there is excess electrical energy available, the frequency increases.

In one embodiment, the controller 16 may reduce consumption of the electrical energy by apparatus 10 (i.e., shed load) if the frequency being monitored drops below a threshold which may be below the nominal frequency in an effort to reduce the consumption of the electrical energy from the electrical power system and in an attempt to avoid a failure of the electrical power system 10 (e.g., blackout or brownout).

In another embodiment, the controller 16 is configured to monitor the status of the thermal energy storage medium 14 (e.g., monitor the temperature of the water in the example water heater embodiment) and to utilize the status to control an amount of electrical energy which is consumed by the thermal energy storage apparatus 10. In one embodiment described below, the monitored status of the thermal energy storage medium 14 may be utilized with a monitored status of the electrical energy upon the electrical power system to control the amount of electrical energy which is consumed by the thermal energy storage apparatus 10.

The controller 16 may also access commands from communications interface 36 and which were originated from externally of the apparatus 10 (e.g., from a regional utility) and which instruct the controller 16 to adjust (reduce or increase) the amount of electrical energy which is consumed by the apparatus 10 according to an additional embodiment. Information regarding surpluses or deficiencies of electrical energy upon the electrical power system may also be communicated to the apparatus 10 and accessed by the controller 16 to control the electrical energy consumption of apparatus 10 as described in further detail below.

Controller 16 may be configured to implement different combinations of the above-described operations with respect to controlling the amount of electrical energy which is consumed by apparatus 10 in different example embodiments.

Figure 4:
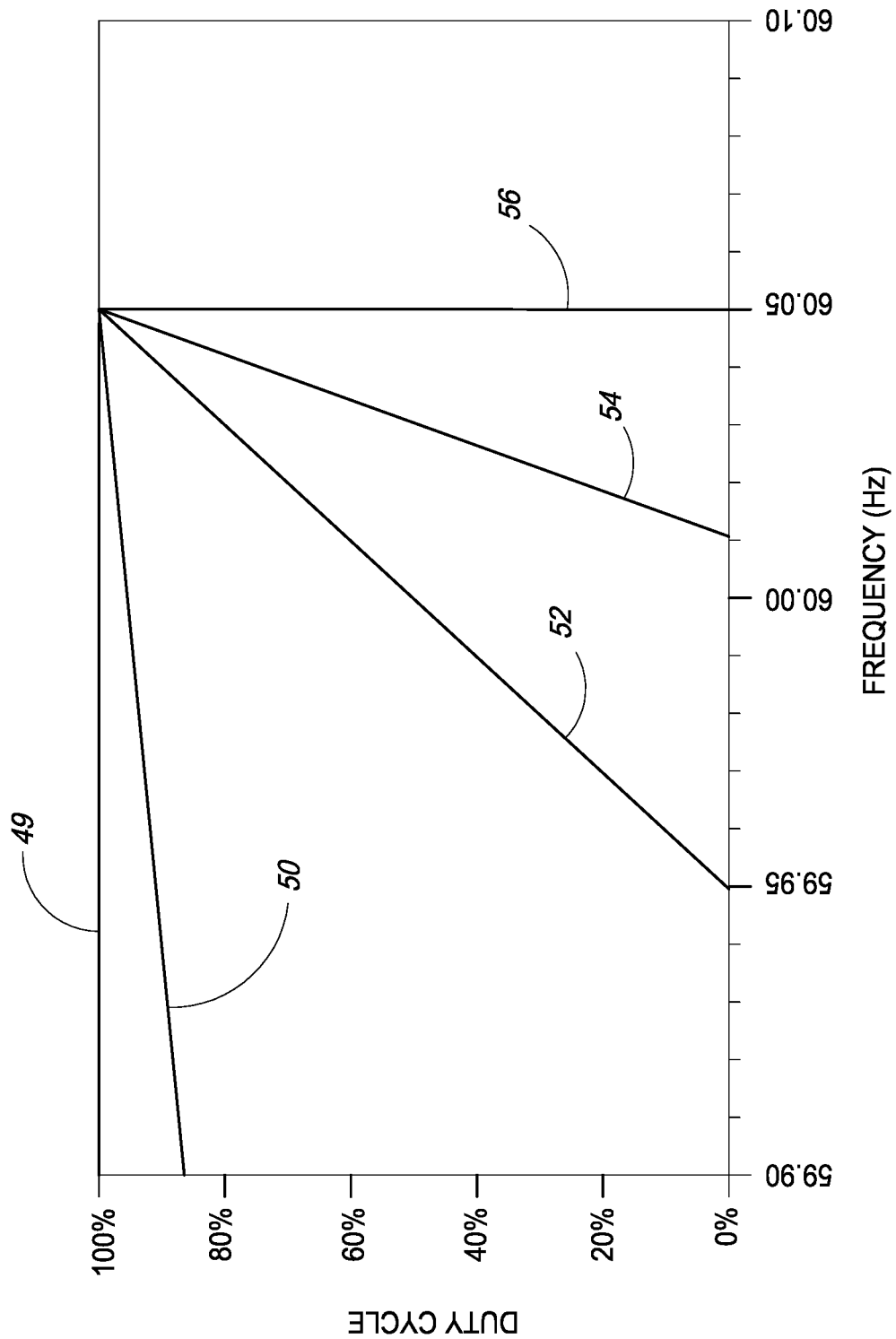
FIG. 4 is a graphical representation of frequency of electrical energy with respect to duty cycles for different temperatures of a thermal energy storage medium according to one embodiment.

Referring to FIG. 4, one embodiment for determining an appropriate amount of electrical energy to be utilized by thermal energy storage apparatus 10 in the form of a water heater is described. FIG. 4 is a graphical representation of an electrical characteristic of electrical energy upon the electrical power system (e.g., frequency) with respect to a duty cycle which may be utilized to control the amount of electrical energy to be consumed by the apparatus 10.

In the embodiment of FIG. 4, controller 16 is configured to utilize information regarding the temperature of the thermal energy storage medium 14 and the monitored characteristic (e.g., frequency) of the electrical energy upon the electrical power system to control the electrical energy consumption of apparatus 20. More specifically, in the described embodiment, controller 16 monitors the frequency of the electrical energy which is received from the electrical power system and which is typically between 59.95 Hz and 60.05 Hz during normal operations of electrical grids within the United States. In addition, the controller 16 monitors the temperature of water within a reservoir of the apparatus 10 implemented as a water heater in the described embodiment.

Controller 16 utilizes the information regarding the electrical characteristic of the electrical energy upon the electrical power system, the temperature of the thermal energy storage medium 14 (e.g., water in the described example), and the graphical representation of FIG. 4 to determine the amount of electrical energy to be consumed by the apparatus 10 in the described embodiment. In one implementation, the controller 16 defines a plurality of intervals of time (e.g., each interval is a period of time, such as 17 seconds) and utilizes the graphical representation of FIG. 4, information regarding the electrical characteristic of the electrical energy and the temperature of the water to determine the amount of electrical energy which is consumed by the apparatus 10 during a respective interval.

In general, the consumer sets the temperature range of water to be provided by the apparatus 10 which is configured as a water heater in the described embodiment. Controller 16 utilizes information regarding the electrical energy upon the electrical power system and the temperature of the water to control the application of electrical energy to the heating element 12 to maintain the desired temperature of water in the water heater while also assisting with balancing of consumption and generation of electrical energy upon the electrical power system.

Figure 5:
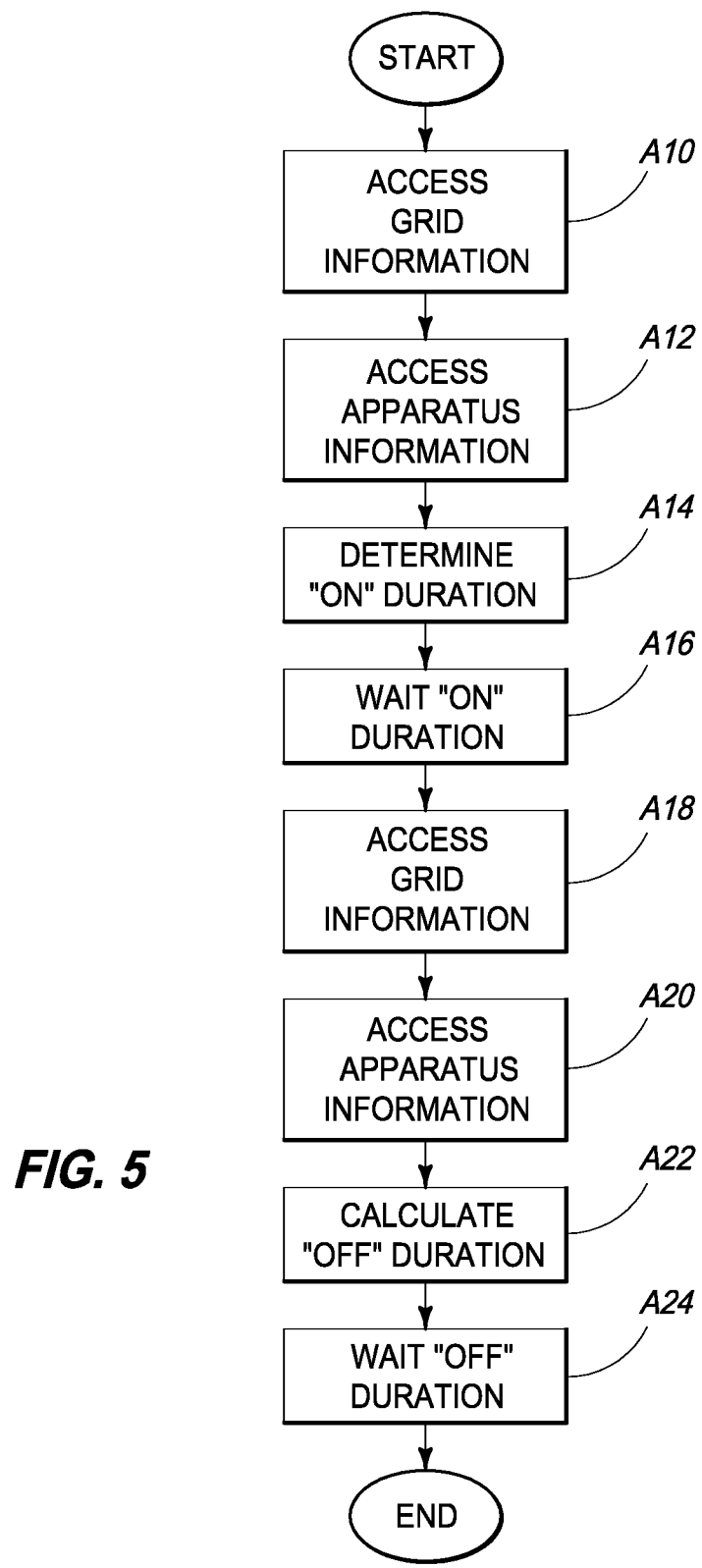
FIG. 5 is a flow chart of a method to control the consumption of electrical energy of a thermal energy storage device according to one embodiment.

Referring to FIG. 5, one example method of determining an amount of electrical energy which is utilized to heat water within a water heater is illustrated and described with respect to FIG. 4. In the described embodiment, the controller 16 implements the illustrated method. Other methods are possible including more, less and/or alternative acts.

At an act A10, the controller accesses information regarding a characteristic of electrical energy upon the electrical power system. For example, the controller may access information regarding the frequency of the electrical energy and which is indicative of a state of balance of the generation and consumption of electrical energy upon the electrical power system.

At an act A12, the controller 16 accesses information regarding the apparatus, such as the temperature of water in the described water heater example.

At an act A14, the controller 16 determines the amount of electrical energy to be utilized for a subsequent interval of time to heat the water within the water heater.

In one example embodiment, calculation of the amount of energy to be consumed for a given interval of time is described with respect to the graphical representation of FIG. 4. The graphical representation includes a plurality of lines 50, 52, 54, 56 which are duty cycle functions which are used to calculate respective duty cycles for different temperatures of the thermal energy storage medium 14 in one embodiment. In the described embodiment where the apparatus 10 is implemented as a water heater, line 49 corresponds to a water temperature at or below 90° F., line 50 corresponds to a water temperature of 100° F., line 52 corresponds to a water temperature of 110° F., line 54 corresponds to a water temperature of 120° F., and line 56 corresponds to a water temperature of 130° F., or higher.

At the beginning of the respective interval, the controller 16 uses the information regarding the frequency of the electrical energy upon the electrical power system, the information regarding the temperature of the water, and duty cycle functions of the graphical representation of FIG. 4 (e.g., implemented as a look-up-table in one embodiment) to determine an appropriate duty cycle. The duty cycle is utilized in the described embodiment to determine the amount of time of the interval (i.e., duty cycle) in which electrical energy is utilized to heat the water.

In the example of FIG. 4, if the water temperature is 120° F. at the beginning of an interval and the frequency is 60.03 Hz at the beginning of the interval, then the controller 16 uses the duty cycle function of line 54 to calculate the duty cycle which is approximately 50% in the described example providing an "On" time for one half of the given interval and an "Off" time for the other half of the given interval. The duty cycle represents the fraction of time the heating element of the water heater consumes energy during the interval or cycle. The duty cycle may be considered to be an average relative water heater power that is made available to heat water as a function of temperature and frequency in the example described embodiment.

The duty cycle functions shown in FIG. 4 were selected based upon a few example criteria in the presently described embodiment. A first criteria is that the water heater is expected to consume virtually no energy if the water temperature is 130° F. or greater as most water heaters should prevent water from exceeding this temperature with a mechanical thermostat. Water heaters that operate above this temperature utilize mixing valves to moderate the delivered water temperature and to protect consumers 28 from scalding themselves. Accordingly, at line 56 corresponding to a temperature of 130° F., the duty cycle function changes instantly from 0 to 1 at 60.05 Hz, and the likelihood that energy will be consumed at this water temperature is negligible regardless of grid frequency.

The duty cycle function of line 54 corresponding to a water temperature of 120° F. was selected because it results in consumption of electrical energy 6.5% of the time which corresponds to an average consumption of a residential water heater in the Western United States having a heating element rated at 4.5 kW. The upper frequency threshold was held constant at 60.05 Hz for all of the duty cycle functions in the described example to preserve the value of the regulating water heaters for down regulation of the electrical power system, for example, when the frequency of the electrical energy upon the electrical power system is greater than the nominal frequency.

The duty cycle function 52 spans the normal grid frequency range. Using this function and this embodiment, a water heater at a temperature of 110° F. would consume energy on average half the time, but three fourths of the consumed energy would be consumed in the upper half of the grid frequency range (i.e., above the electrical power system's nominal frequency).

The line 50 corresponds to a duty cycle function when the water temperature is 100° F. where the customer may be inconvenienced or uncomfortable due to the relatively low water temperature. The duty cycle function of line 50 was generated to virtually ignore the conditions of the electrical power system when the water temperature is below convenient or comfortable temperatures for use.

The duty cycle 49 corresponds to water temperature that is unacceptably cool, perhaps at or below 90° F. At this cold temperature, the control of FIG. 4 ignores electric power system frequency and allows the switch 18 to remain closed (on) in one embodiment.

At an act A16, in one implementation, the controller 16 controls the switch 18 of FIG. 1 to operate in an "on" or closed state and provide electrical energy to the heating element 12 for the calculated "On" time of the duty cycle which is approximately 50% of the interval in this example (e.g., electrical energy is provided to the heating element 12 for an "On" time of approximately 8.5 seconds if the interval is 17 seconds in one embodiment).

At an act A18, which corresponds to the end of the "On" portion of a given interval, the controller 16 may again access information regarding the characteristic of the electrical energy upon the electrical power system.

At an act A20, the controller 16 may access information regarding the temperature of the water.

At an act A22, the controller 16 may utilize the newly acquired information from acts A18 and A20 to calculate a new duty cycle and determine whether adjustment of the previously calculated "Off" portion is appropriate. If the newly calculated duty cycle is the same as previously calculated for the given interval, the controller 16 utilizes the previously calculated "Off" portion (e.g., 8.5 seconds in the above-described example). However, the status of the electrical energy upon the electrical power system and/or the temperature of the water of the water heater may vary from the information previously utilized to calculate the "Off" portion of the given interval. If the newly calculated duty cycle is greater than the previously calculated duty cycle for the given period (i.e., greater than 50%), then the controller may reduce the "Off" period to a reduced period of time (e.g., a new "Off" period which is less than 8.5 seconds) corresponding to the newly calculated regulation.

In another embodiment, the controller 16 utilizes the "Off" duration which was previously calculated with the "On" duration at the start of the given interval.

At an act A24, the controller controls the switch 18 to operate in an "off" or open state for the appropriate "Off" period determined in act A22 (or alternatively using the "Off" period of time determined in act A14 for the given interval). Following the waiting for the appropriate period of time, the controller 16 may return to act A10 to repeat the method of FIG. 5 for a new, subsequent interval.

Referring again to the example embodiment of FIG. 4, if the temperature of the water is 130° F. (corresponding to the duty cycle function of line 56), only that electrical energy which is delivered at a frequency exceeding 60.05 Hz is utilized to heat the water. Furthermore with respect to the described example, if the water temperature is 120° F., the water heater is allowed to operate approximately 6.5% of the time using 6.5% of the highest frequencies within a normal grid distribution and is allowed to maintain its average consumption at this temperature. As the water temperature decreases, an increasingly larger portion of the grid frequency distribution is used to heat the water and maintain consumer satisfaction.

The example of FIG. 4 may be considered to be most effective if an upper mechanical thermostat of the water heater is set at or below 120° F. and a lower thermostat of the water heater is set higher than 120° F. but below a potentially scalding temperature (e.g., 130° F.). In this described example implementation, the controller will send average power to the lower heating element of the water heater during relatively high frequency periods of the electrical energy upon the electrical power system and the lower heating element may absorb the additional energy. In addition, the controller may rapidly provide power to the upper heating element while water load is relatively high and will heat the lower half of the water tank reservoir of the water heater using electrical energy of only relatively high grid frequencies.

In this described example, the set point of the temperature of the water is controlled by the controller 16 as opposed to the upper and lower thermostats of the water heater and the temperature of the water remains near its desired set point a majority of the time. In this example arrangement, the down-regulation service of the electrical power system provided by the thermal energy storage apparatus 10 continues to be available in the presence of frequencies upon the electrical power system which are above the nominal frequency. In addition, customers are protected from scalding by the controller 16 and mechanical thermostats of the water heater acting in series in one embodiment.

As discussed above, intervals are used in one embodiment and the calculated respective duty cycles are applied to the intervals to control the amount of electrical energy which is consumed by the thermal energy storage apparatus 10 during the respective intervals (e.g., utilize energy during 0-100% of the each interval depending upon the duty cycle resulting from the frequency of the electrical energy of the electrical power system and the temperature of the water in one embodiment). Intervals of different lengths may be utilized, and in one embodiment, the interval duration of 17 seconds was selected as a tradeoff between regulation accuracy (which favors intervals of short duration) and longevity of switch 18. In one embodiment, the interval is a relatively small fraction of the time over which the frequency typically remains self-correlated.

The example embodiment discussed above discloses a thermal energy storage apparatus (e.g., water heater in one described embodiment) 10 which is configured to control an amount of electrical energy which is consumed by the apparatus 10 based upon an electrical characteristic of electrical energy upon an electrical power system and the temperature of the water.

In the described example, apparatus 10 is configured as a water heater which operates to provide up-regulation services by limiting the consumption of electrical energy by the heating element 12 in a given interval according to the duty cycle as a result of the frequency of the electrical energy upon the electrical power system falling and the temperature of the water. The limiting of the consumption of the electrical energy according to the duty cycle over a given interval of time reduces energy consumption compared with conventional operations of water heaters which operate based only upon thermostat settings and which may otherwise be constantly consuming energy for the same interval of time.

Furthermore, the water heater may provide down-regulation services with respect to the electrical power system by controlling the heating element 12 to consume electrical energy (which may otherwise be in a non-heating state according to the settings of the thermostats of the water heater) as a result of the frequency of the electrical energy upon the electrical power system rising.

Accordingly, in one embodiment, the operations of curtailing or increasing the consumption of electrical energy by the apparatus 10 based upon the electrical characteristic(s) of the electrical power system and water temperature operate to provide regulation services to the electrical power system which assists with improving the state of balance of the electrical power system (i.e., reducing a difference of consumption and generation of electrical energy with respect to the electrical power system) compared with utilization of other apparatus which are controlled by mechanical thermostat settings and which are not configured to control the consumption of the electrical energy based upon the state of the electrical energy upon the electrical power system.

The above-described example methods and apparatus 10 provide regulation services to the electrical power system inasmuch as the method and apparatus 10 monitor characteristics of the electrical power system and control an amount of electrical energy consumed by the methods and apparatus 10 using the monitored characteristics in one embodiment. The utilization of numerous apparatus 10 (e.g., thousands of water heaters in residential and commercial applications) coupled with a common electrical power system described according to example embodiments herein may operate to lower the frequency of the electrical energy upon the electrical power system when generation exceeds consumption (i.e., by increasing consumption of apparatuses 10) and increase the frequency of the electrical energy upon the electrical power system when consumption exceeds generation (i.e., by reducing the consumption by apparatuses 10) which provides an improved state of balance of consumption and generation of the electrical power system in one embodiment.

Figure 6:
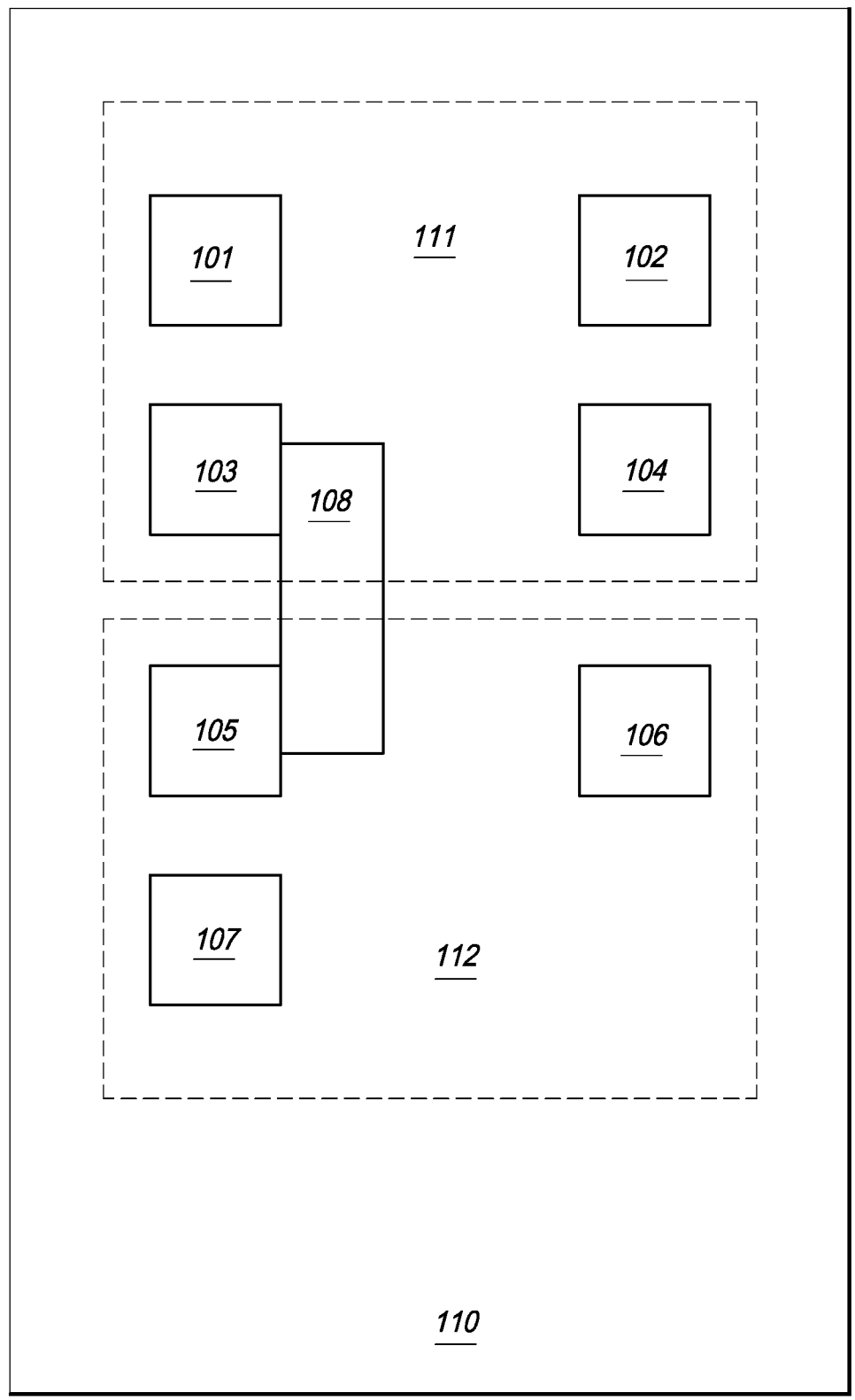
FIG. 6 is a schematic illustration of a typical water heater thermostat unit.
Figure 7:
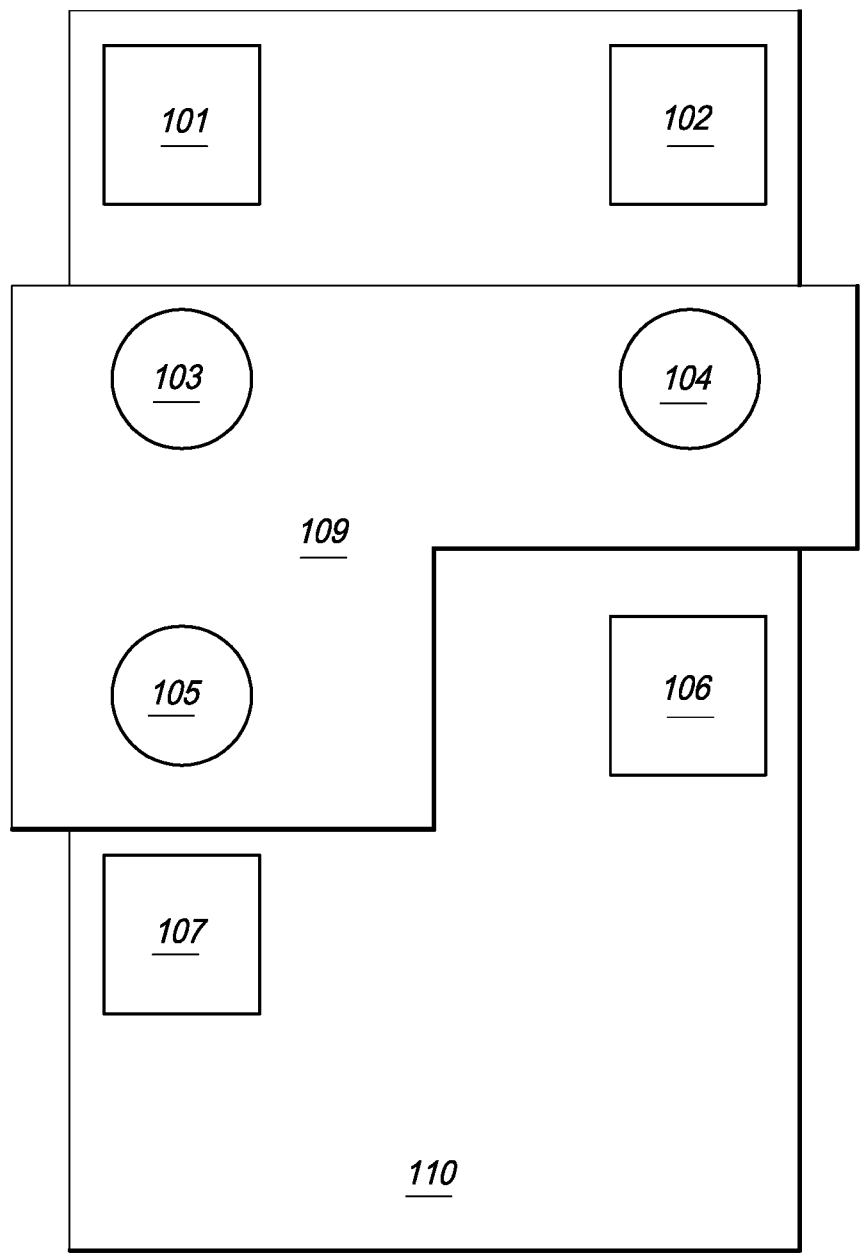
FIG. 7 is a schematic illustration that shows a retrofit kit including a control module which is attached to a water heater thermostat unit according to one embodiment.
Figure 8:
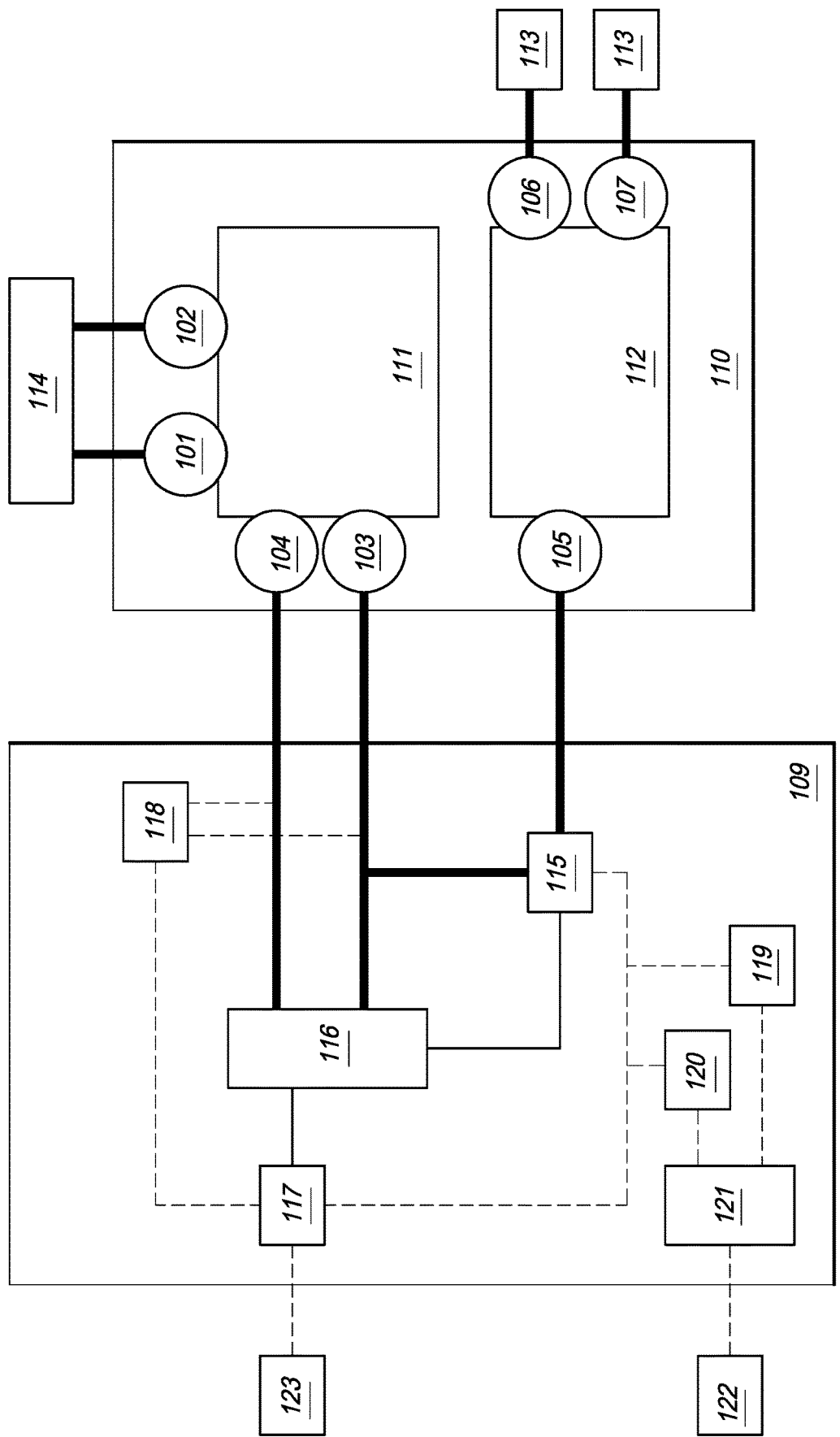
FIG. 8 is a schematic illustration that shows the components of circuitry that may be used in a control module according to one embodiment.

Referring to FIGS. 6-8, an example embodiment of a retrofit kit which may be applied to conventional water heaters is described. As shown in the schematic illustration of FIG. 6, a typical upper water heater thermostat unit 110 has seven electrical terminals that are readily exposed. The upper four terminals, shown in FIG. 6 as terminals 101, 102, 103, and 104, form the high temperature cutoff thermostat 111. The lower three terminals, shown in FIG. 6 as terminals 105, 106, and 107, form the upper regulatory thermostat 112. Terminals 100 and 102 are the AC power inputs for the upper regulatory thermostat 111. Terminals 103 and 104 are the AC power outputs for the upper regulatory thermostat 111. Terminal 105 is the AC power input for the upper regulatory thermostat 112. Terminals 106 and 107 are AC power outputs to the resistive elements that heat the water in the water heater. A typical upper water heater thermostat unit 110 also has a shunt, 108, that forms a connection between terminal 103 and terminal 105.

The connection between the control module in the retrofit embodiment of the present invention and the terminals of a typical upper water heater thermostat unit 110 is shown in FIG. 7. As illustrated in FIG. 7, the control module 109 includes three electrical connections that line up with terminals 103, 104, and 105 of a typical upper water heater thermostat unit 110 shown in FIG. 6. To install the control module 109, all that is required is that the shunt 108 is removed, and the screws in terminals 103, 104, and 105 are removed, the control module 109 is positioned over the terminals, and then the screws are replaced so that the electrical connections of the control module 109 are now connected to terminals 103, 104, and 105.

The control module 109 further includes the circuitry as shown in FIG. 8. Combined with the electrical connections between the control module 109 and terminals 103, 104, and 105 as shown in FIG. 7, the control module 109 thus forms a switch between terminal 103 and terminal 105. This connection allows the control module 109 to control the output to both the resistive elements through terminals 106 and 107. The circuitry shown in FIG. 8 allows the control module 109 to optimize the operation of the water heater to accommodate a wide variety of considerations.

Preferably, this circuitry includes a switch 115 (e.g., one example embodiment of switch 18 described above). In the retrofit embodiment shown in FIG. 7, the switch 115 of control module 109 is a hybrid relay. As previously described, the hybrid relay has an electromechanical relay and a semiconductor switch that are electrically in parallel. In this configuration, the semiconductor switch may be configured to close the connection prior to the electromechanical relay, and the electromechanical relay may be configured to open the connection prior to the semiconductor switch. In this manner, control module 109 allows for rapid and frequent switching to maximize the advantages of the advanced controller system while preserving the longevity of the electrical components, such as the electromechanical relay.

As shown in FIG. 8, control module 109 also includes circuitry to control the hot water heater. In the embodiment shown in FIG. 8, the switch 115 of control module 109 is connected to the high temperature cutoff thermostat 111 and the upper regulatory thermostat 112 of the water heater. These connections are made to terminals 103, 104, and 105 as previously described and shown in FIG. 7. Thus, as shown in FIG. 8, the switch 115 of control module 109 is electrically in series with both the high temperature cutoff thermostat 111 and the upper regulatory thermostat 112 of the water heater.

As shown in FIG. 8, the high temperature cutoff thermostat 111 and the upper regulatory thermostat 112 of the water heater are powered by the AC power supply 114. While not meant to be limiting, typically the AC power supply 114 will consist of a hardwired connection in a residential or commercial building.

Control module 109 includes a low voltage power supply 116 that receives AC power from terminals 103 and 104 of the high temperature cutoff thermostat 111 and provides voltage suitable for digital signal processing to microprocessor 117, switch 115 and other digital components of control module 109. As will be recognized by those having ordinary skill in the art of the design of digital circuitry, this is merely one possible configuration.

The low voltage power supply 116 could be connected to the digital components of control module 109 in a variety of different configurations, which all would provide the same end result; the provision of low voltage power to the digital components of control module 109. Accordingly, the particular arrangement of the low voltage power supply and other digital components of control module 109 set forth in FIG. 8 is merely intended to illustrate one possible arrangement of these components, and the present invention should in no way be limited to the specific arrangement of the digital components shown in this example.

Control module 109 includes a microprocessor 117 (e.g., one example embodiment of processing circuitry 36 described above) which is configured to control the operation of switch 115 and interface with the other digital components of control module 109. As shown in FIG. 8, the microprocessor 117 is in communication with the switch 115 and to the autonomous sensing circuitry 118, the communicated control circuitry 119, and the autonomous and communicated control protocols 120. Additionally, microprocessor 117 may receive information from measurement equipment 123. Examples of measurement equipment 123 include thermostats, thermometers (e.g., one example embodiment of temperature sensor 15 described above), occupancy sensors, water flow meters, voltmeters, ammeters, and combinations thereof that can measure the temperature of the water in the water heater, the temperature outside, energy consumption patterns, and the voltage and amperage of power consumed by the water heater.

The autonomous sensing circuitry 118 (e.g., one example embodiment of monitoring circuitry 17 described above) is able to sense signals that include, but are not limited to, sensing the electrical power system voltage, sensing the electrical power grid frequency, and combinations thereof. Using that information, the microprocessor 117 can be configured to turn the water heater on or off. For example, in a condition where the electrical power grid frequency was below a pre-determined frequency, for example 59.9 Hertz, the autonomous sensing circuitry 118 could send a signal to the microprocessor 117, which would then turn the water heater off.

The communicated control circuitry 119 (e.g., one example embodiment of communications interface 36 described above), is connected to a source of communicated signals 122 preferably through electrical isolation circuitry 121. This source of communicated signals 122 these can be any commonly used protocol for transmitting signals, including, without limitation, wireless and wired communications, analogue radio signals, such as AM and FM radio waves, digital signals, such as wireless digital television broadcast signals, digital signals, including those using common communications protocols such as TCP/IP.

Regardless of the specific source of communicated signals 122, the communicated control circuitry 119 is designed to allow communications from the outside world to impact the operation of the water heater. Thus, as an illustrative example and not to be limiting, the communicated control circuitry 119 of the advanced electric water heater controller system of the present invention could receive communicated signals 122 from the electrical power company that indicated that excess electrical power was available as a result of excess wind energy being generated. The communicated control circuitry 119 could then transfer this information to the microprocessor 117 which would then override the current status of the switch 115 and turn the water heater on to take advantage of the excess power available on the electrical power system, and to store that energy in the form of hot water.

Electrical isolation circuitry 121, if used, protects the source of communicated signals 122, which operates at relatively low signal voltages, from exposure to, and potential damage by, the relatively high voltages from the communicated control circuitry 119.

The microprocessor 117 is also connected to circuitry that manages the autonomous and communicated control protocols 120. The circuitry that provides the autonomous and communicated control protocols 120 is further connected to a source of communicated signals 122 that provides data to the water heater. This connection, too, is preferably completed through electrical isolation circuitry 121.

As will be recognized by those having skill in the art, the circuitry that provides the autonomous and communicated control protocols 120 can be configured as a fixed circuit, but is preferably provided either as software or as programmable firmware. Accordingly, the circuitry that provides the autonomous and communicated control protocols 120 can be altered to provide an endless variety of protocols for controlling the hot water heater using the autonomous and communicated controls. For example, and not meant to be limiting, the communicated control protocols 120 and processor 117 can jointly enact different protocols for different times of day, or different protocols for different communicated or autonomous signals, or combinations thereof. Further, these protocols can give primacy to any of the signals (communicated, autonomous, or otherwise) that are input into the control module 109 for controlling the water heater, and can include complex hierarchical decision making algorithms that account for all the variables that the control module 109 may encounter, and give primacy to any number of combinations of those considerations. Accordingly, the control module 109 of the present invention is able to optimize the operation of the water heater to accommodate a wide variety of considerations, as previously described.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A thermal energy storage apparatus controller comprising:
   processing circuitry configured to:
   access first information which is indicative of surpluses and deficiencies of electrical energy upon an electrical power system at a plurality of moments in time;
   access second information which is indicative of a temperature of a thermal energy storage medium at a plurality of moments in time;
   use the first and second information to control an amount of electrical energy which is utilized by a heating element to heat the thermal energy storage medium at a plurality of respective moments in time; and
   wherein the processing circuitry accesses the first information comprising information regarding an electrical characteristic of the electrical energy upon the electrical power system, wherein the electrical characteristic is indicative of the surpluses and deficiencies of the electrical energy upon the electrical power system.

2. The controller of claim 1 wherein the processing circuitry accesses the second information which is indicative of the temperature of the thermal energy storage medium comprising water within a reservoir of a water heater, and the processing circuitry is configured to use the first and second information to control the amount of electrical energy which is utilized by the heating element of the water heater.

3. The controller of claim 1 wherein the electrical characteristic is intentionally varied to control the amount of the electrical energy which is utilized by the heating element to heat the thermal energy storage medium during at least one of the moments in time.

4. The controller of claim 1 wherein the electrical characteristic comprises frequency of the electrical energy upon the electrical power system.

5. The controller of claim 1 wherein the processing circuitry is configured to increase the amount of electrical energy which is utilized by the heating element to heat the thermal energy storage medium at one of the moments in time as a result of the first information indicating a surplus of the electrical energy upon the electrical power system at the one moment in time, and the processing circuitry is configured to decrease the amount of electrical energy which is utilized by the heating element to heat the thermal energy storage medium at another of the moments in time as a result of the first information indicating a deficiency of the electrical energy upon the electrical power system at the another moment in time.

6. The controller of claim 1 wherein the first information indicates a relationship of consumption and generation of electrical energy upon the electrical power system, and the processing circuitry is configured to control the amount of electrical energy which is utilized by the heating element to heat the thermal energy storage medium to provide an improved state of balance of the consumption and the generation of the electrical energy with respect to the electrical power system compared with a state of balance of the consumption and the generation of the electrical energy with respect to the electrical power system in an absence of the controlling.

7. The controller of claim 1 wherein the processing circuitry is configured to select one of a plurality of different functions using the second information, and to use the selected function and the first information to control the amount of the electrical energy which is utilized by the heating element to heat the thermal energy storage medium at one of the moments in time.

8. The controller of claim 7 wherein the functions individually include a plurality of different associations of the first information with a plurality of different amounts of the electrical energy which are utilized by the heating element to heat the thermal energy storage medium.

9. The controller of claim 8 wherein the functions include the different associations of the first information with the different amounts of the electrical energy for a common temperature of the thermal energy storage medium.

10. The controller of claim 7 wherein the processing circuitry is configured to select another of the functions using the second information at another of the moments in time and to use the another function to control the amount of the electrical energy which is utilized by the heating element to heat the thermal energy storage medium.

11. The controller of claim 7 wherein the functions cause the processing circuitry to control different amounts of the electrical energy to be utilized by the heating element to heat the thermal energy storage medium for a single value of the first information at the respective moments in time.

12. The controller of claim 7 wherein the functions cause the processing circuitry to use different duty cycles to control amounts of the electrical energy which are utilized by the heating element to heat the thermal energy storage medium for a single value of the first information at the respective moments in time.

13. The controller of claim 7 wherein the functions correspond to a common overlapping range of values of the first information which are indicative of the surpluses and deficiencies of the electrical energy upon the electrical power system at the respective moments in time.

14. The controller of claim 7 wherein the functions correspond to a common overlapping range of different amounts of the electrical energy which are utilized by the heating element to heat the thermal energy storage medium at the respective moments in time.

15. The controller of claim 7 wherein the processing circuitry is configured to cease the heating of the thermal energy storage medium by the heating element at another moment in time as a result of the first information triggering a threshold.

16. The controller of claim 7 wherein the processing circuitry is configured to select another of the functions using the second information and to use the another function at another of the moments in time to cease the heating of the thermal energy storage medium by the heating element as a result of the temperature of the thermal energy storage medium being greater than a first threshold and the first information indicating an amount of the electrical energy upon the electrical power system being less than a second threshold.

17. The controller of claim 7 wherein different ones of the functions relate different ranges of the first information with a common overlapping range of different amounts of the electrical energy which are utilized by the heating element to heat the thermal energy storage medium.

18. The controller of claim 7 wherein the one function is configured to cause the processing circuitry to control different non-zero amounts of the electrical energy to be utilized by the heating element for different values of the first information.

19. The controller of claim 7 wherein the functions are different relationships of different non-zero amounts of the electrical energy to be utilized by the heating element for different values of the first information.

20. The controller of claim 1 wherein the processing circuitry is configured to monitor the electrical characteristic of the electrical energy upon the electrical power system to access the first information.

21. The controller of claim 20 the processing circuitry is configured to monitor the electrical characteristic of the electrical energy at a location of the thermal energy storage medium.

22. The controller of claim 1 wherein the processing circuitry is configured to control the amount of the electrical energy which is utilized by the heating element to heat the thermal energy storage medium without use of the first information as a result of the second information indicating that the temperature of the thermal energy storage medium is at or below a threshold temperature.

23. The controller of claim 1 wherein the heating element comprises a first heating element, the processing circuitry is configured to control an amount of electrical energy which is utilized by a second heating element to heat the thermal energy storage medium, and the processing circuitry is configured to use the first and second information to only control the amount of the electrical energy which is utilized by the first heating element to heat the thermal energy storage medium at the moments in time.

24. The controller of claim 1 wherein the processing circuitry is configured to only use the first information to control the amount of electrical energy which is utilized by the heating element to heat the thermal energy storage medium at an additional moment in time.

25. The controller of claim 1 wherein the processing circuitry is configured to control the amount of electrical energy which is utilized by the heating element to heat the thermal energy storage medium with use of the first information and without use of the second information at an additional moment in time.

26. The controller of claim 1 wherein the processing circuitry is configured to control the amount of electrical energy which is utilized by the heating element to heat the thermal energy storage medium with use of the second information and without use of the first information at an additional moment in time.

27. A thermal energy storage apparatus controller comprising:
processing circuitry configured to:
access first information which is indicative of surpluses and deficiencies of electrical energy upon an electrical power system at a plurality of moments in time;
access second information which is indicative of a temperature of a thermal energy storage medium at a plurality of moments in time;
use the first and second information to control an amount of electrical energy which is utilized by a heating element to heat the thermal energy storage medium at a plurality of respective moments in time;
wherein the processing circuitry is configured to select one of a plurality of different functions using the second information, and to use the selected function and the first information to control the amount of the electrical energy which is utilized by the heating element to heat the thermal energy storage medium at one of the moments in time; and
wherein the processing circuitry is configured to select another of the functions using the second information at another of the moments in time and to use the another function to control the amount of the electrical energy which is utilized by the heating element to heat the thermal energy storage medium without use of the first information.

28. A thermal energy storage apparatus controller comprising:
processing circuitry configured to:
access first information which is indicative of surpluses and deficiencies of electrical energy upon an electrical power system at a plurality of moments in time;
access second information which is indicative of a temperature of a thermal energy storage medium at a plurality of moments in time;
use the first and second information to control an amount of electrical energy which is utilized by a heating element to heat the thermal energy storage medium at a plurality of respective moments in time; and wherein the processing circuitry is configured to control the amount of the electrical energy which is utilized by the heating element to heat the thermal energy storage medium at another moment in time to be a predefined non-zero amount without use of the first information if the second information indicates that the temperature of the thermal energy storage medium is less than a threshold.

29. The controller of claim 28 wherein the predefined non-zero amount is at least a substantially maximum amount of the electrical energy which is utilized by the heating element to heat the thermal energy storage medium.

30. A thermal energy storage apparatus controller comprising:

processing circuitry configured to:

access first information which is indicative of surpluses and deficiencies of electrical energy upon an electrical power system at a plurality of moments in time;

access second information which is indicative of a temperature of a thermal energy storage medium at a plurality of moments in time;

use the first and second information to control an amount of electrical energy which is utilized by a heating element to heat the thermal energy storage medium at a plurality of respective moments in time;

wherein the processing circuitry is configured to only use the first information to control the amount of electrical energy which is utilized by the heating element to heat the thermal energy storage medium at an additional moment in time; and wherein the processing circuitry is configured to only use the first information as a result of the first information exceeding a threshold.

* * * * *

UNITED STATES PATENT AND TRADEMARK OFFICE
CERTIFICATE OF CORRECTION

PATENT NO. : 11,106,228 B2
APPLICATION NO. : 15/144590
DATED : August 31, 2021
INVENTOR(S) : Donald J. Hammerstrom Page 1 of 1

It is certified that error appears in the above-identified patent and that said Letters Patent is hereby corrected as shown below:

On the Title Page

Item [56], 2nd Column, 13th Line – Replace "WO PCT/US2011/040393 Search Rept., dated Aug. 8, 2012, Bat-" with --WO PCT/US2011/040393 Search Rept., dated Aug. 28, 2012, Bat- --

Item [56], page 2, 2nd Column, 7th Line – Replace "WO PCT/US2011/040393 Writt. Opin., dated Aug. 8, 2012, Battelle" with --WO PCT/US2011/040393 Writt. Opin., dated Aug. 28, 2012, Battelle--

In the Specification

Column 1, Line 22 – Replace "Contract DE-AC0576RLO1830" with --Contract DE-AC05-76RL01830--

Column 11, Line 42 – Replace "of the each interval" with --of each interval--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*